United States Patent
Kayser

(10) Patent No.: US 9,739,390 B2
(45) Date of Patent: Aug. 22, 2017

(54) VALVE PRESSURE ASSEMBLY AND METHODS OF OPERATING THE SAME

(71) Applicant: Bonanza Creek Energy Operating Company, LLC, Denver, CO (US)

(72) Inventor: Fred Kayser, Eaton, CO (US)

(73) Assignee: Bonanza Creek Energy Operating Company, LLC, Denver, CO (US)

( * ) Notice: Subject to any disclaimer, the term of this patent is extended or adjusted under 35 U.S.C. 154(b) by 90 days.

(21) Appl. No.: 14/939,378

(22) Filed: Nov. 12, 2015

(65) Prior Publication Data

US 2017/0138498 A1    May 18, 2017

(51) Int. Cl.
| F16K 15/00 | (2006.01) |
| F16K 27/02 | (2006.01) |
| F16K 17/02 | (2006.01) |
| F16K 51/00 | (2006.01) |
| B65D 90/10 | (2006.01) |
| B65D 90/34 | (2006.01) |

(52) U.S. Cl.
CPC .......... *F16K 27/0209* (2013.01); *F16K 17/02* (2013.01); *F16K 51/00* (2013.01); *B65D 90/105* (2013.01); *B65D 90/34* (2013.01); *Y10T 137/6075* (2015.04)

(58) Field of Classification Search
CPC ...... F16K 27/0209; F16K 17/02; F16K 51/00; F16K 15/18; F16K 15/181; Y10T 137/6075; B65D 47/32; B65D 90/105; B65D 90/34
See application file for complete search history.

(56) References Cited

U.S. PATENT DOCUMENTS

| 1,666,935 | A | | 4/1928 | Howell | |
|---|---|---|---|---|---|
| 1,753,024 | A | * | 4/1930 | Rode | F16K 17/082 |
| | | | | | 137/529 |
| 2,211,281 | A | | 8/1940 | Mason | |
| 2,251,924 | A | | 8/1941 | Drane | |
| 2,588,876 | A | | 3/1952 | Quist | |
| 3,439,831 | A | * | 4/1969 | Pullen | B65D 90/34 |
| | | | | | 220/203.09 |
| 3,965,916 | A | | 6/1976 | Karas | |
| 3,974,850 | A | * | 8/1976 | Pierson | F16K 17/19 |
| | | | | | 137/493.9 |
| 4,431,023 | A | | 2/1984 | Johnson | |
| 5,158,022 | A | * | 10/1992 | Dugge | B61D 5/08 |
| | | | | | 105/377.07 |

(Continued)

*Primary Examiner* — Craig Schneider
*Assistant Examiner* — Kevin Barss
(74) *Attorney, Agent, or Firm* — Stinson Leonard Street LLP

(57) ABSTRACT

A valve pressure assembly for pressurizing an actuating mechanism of a thief hatch is provided. The valve pressure assembly includes a pressure bar comprising a first end, a second end, and a body located between the first end and the second end; a connector coupled to the body and configured to removably couple to the actuating mechanism; and a clamp coupled to at least one of the first end and the second end, the clamp comprising a fastener removably coupled to the relief valve, wherein the fastener is configured to adjustably move the pressure bar and the connector in contact with the actuating mechanism to facilitate pressuring the actuating mechanism to remain in an operative position.

20 Claims, 6 Drawing Sheets

(56) References Cited

U.S. PATENT DOCUMENTS

| | | | |
|---|---|---|---|
| 5,226,442 A * | 7/1993 | Taylor | F16K 17/19 |
| | | | 137/493.4 |
| 6,305,412 B1 * | 10/2001 | Steele | F16K 17/196 |
| | | | 137/493.4 |
| 6,749,392 B1 | 6/2004 | Adams | |
| 7,469,713 B2 * | 12/2008 | Mackal | F16K 15/18 |
| | | | 137/522 |
| 8,939,309 B2 | 1/2015 | Meacham | |
| 2012/0313030 A1 | 12/2012 | Girard | |
| 2013/0264341 A1 | 10/2013 | Cockerham | |
| 2014/0331704 A1 | 11/2014 | Kondrk | |
| 2016/0236835 A1 * | 8/2016 | Xiqing | B65D 90/34 |

* cited by examiner

VALVE PRESSURE ASSEMBLY AND METHODS OF OPERATING THE SAME

BACKGROUND

The disclosure relates generally to pressure relief valves, and more particularly, to valve pressure assemblies that maintain a pressure of a thief hatch while the thief hatch is open and in an operative state.

Storage tanks, such as an above-ground or below-ground storage tank, may include openings designed to accept a venting device, such as a thief hatch, to provide access to the interior of the storage tank. For example, the thief hatch may provide a resealable opening through which a tool may be inserted into the interior of the storage tank.

The internal pressure (for example, internal vapor pressure) of storage tanks may vary and may depend on various factors, such as the amount of fluid in the storage tank, the volatility of the fluid in the storage tank, the temperature of the fluid in the storage tank, the temperature outside the storage tank, and the thermal conductivity of the walls of the storage tank. Accordingly, excessive vapor pressure in the storage tank may be relieved in a controlled fashion. For example, a thief hatch may provide a seal that blocks fluid communication between the interior of the storage tank and the exterior of the storage tank when the vapor pressure within the tank is below a threshold and enables fluid communication between the interior of the storage tank and the exterior of the storage tank when the vapor pressure within the tank is above the threshold.

Some thief hatches include a seal assembly to prevent leakage of the fluid and/or vapors around and/or through a valve or a valve seat. Conventional seal assemblies include an inner gasket coupled near the valve seat and outer gasket coupled near a cap 32 or lid of the thief hatch. When the cap 32 is closed, the inner gasket facilitates sealing the valve seat to keep the vapors/fluid within the storage tank. Moreover, when the cap 32 is closed, the outer gasket facilitates sealing the cap 32 to the keep any vapors/fluid that has passed the inner gasket from escaping the cap 32. The inner gasket and the outer gasket prevent vapor/fluid leakage from the storage tank and into the atmosphere or surrounding environment. Over time the inner gasket and/or outer gasket break down which can lead to fluid or vapor discharge and reduced pressurization of the storage tank. Moreover, the vapor/fluid may discharge into the atmosphere and/or surrounding environment leading to health and environmental issues. For safety, environment, and/or maintenance reasons, the gaskets may require maintenance inspection and/or replacement.

During typical maintenance and/or replacement inspections, a worker disconnects the cap 32 of the thief hatch and rotates the cap 32 to an open position. In the open position, the pressure of the actuating number, for example a spring, of the thief hatch is released. Since the biasing pressure is released, the pressure of the vapor or fluid present in the storage tank may discharge through the thief hatch valve to expose the worker to dangerous vapors and/or fluids. Moreover, the discharged vapor and/or fluids flow into the atmosphere or surrounding environment leading to environmental issues. Additionally, with the biasing pressure of the actuating mechanism released, it may be difficult for the worker to determine if the inner gasket has failed. More particularly, since the internal pressure may be released through the thief hatch valve, the inner gasket is not exposed to the full internal pressure to show leakage or failure signs. Accordingly, the worker typically replaces both the inner gasket and the outer gasket in an abundance of caution. The typical replacement procedure may lead to increased effort, time, material, and/or exposure for the worker.

Accordingly, it would be advantageous to open a thief hatch cap while maintaining the actuating mechanism of the thief hatch in a pressurized or operative state/position. Moreover, it would be advantageous to open a thief hatch cap to provide visual and/or physical access to the inner gasket and the outer gasket while maintaining the internal pressure of the storage tank. Additionally, it would be advantageous to provide a safer, efficient, and sounder process for inspection, maintenance, and/or replacement of the inner gasket and/or the outer gasket.

BRIEF DESCRIPTION

In one aspect, a valve pressure assembly for pressurizing an actuating mechanism of a thief hatch is provided. The valve pressure assembly includes a pressure bar comprising a first end, a second end, and a body located between the first end and the second end; a connector coupled to the body and configured to removably couple to the actuating mechanism; and a clamp coupled to at least one of the first end and the second end. The clamp includes a fastener removably coupled to the relief valve, wherein the fastener is configured to adjustably move the pressure bar and the connector in contact with the actuating mechanism to facilitate pressuring the actuating mechanism to remain in an operative position.

In another aspect, a valve assembly for coupling to a storage container is provided. The valve assembly includes a thief hatch and a valve pressure assembly coupled to the pressure relief valve. The thief hatch includes a base 30 configured to couple to the storage container and a cap rotatably coupled to the base 30. An actuating mechanism is configured to exert a biasing force against a valve that is positioned in flow communication with the storage container. The valve pressure assembly includes a pressure bar having a first end, a second end, and a body located between the first end and the second end. A connector is coupled to the body and configured to removably couple to the actuating mechanism. A clamp is coupled to at least one of the first end and the second end. The clamp includes a fastener removably coupled to the relief valve, wherein the fastener is configured to adjustably move the pressure bar and the connector in contact with the actuating mechanism to facilitate pressuring the actuating mechanism to remain in an operative position.

Still further, in an aspect, a method of operating a valve pressure assembly to maintain an actuating member of a pressure relief valve in an operating position is provided. The method includes coupling a clamp to a pressure bar, positioning the pressure bar next to the actuating mechanism; coupling the clamp to the pressure relief valve; and selectively adjusting the clamp relative to the pressure relief valve to move the pressure bar against the actuating mechanism to pressure the actuating mechanism into the operative position.

BRIEF DESCRIPTION OF THE DRAWINGS

Features, aspects, and advantages of the present disclosure will become better understood when the following Detailed Description is read with reference to the accompanying drawings in which like characters represent like parts throughout, wherein.

DETAILED DESCRIPTION OF THE DRAWINGS

The embodiments described herein relate to a valve pressure assembly that can easily, efficiently, and economically adapt to a pressure relief valve system such as, for example only, a thief hatch. Moreover, the embodiments relate to opening a thief hatch while maintaining the spring or actuating mechanism in a pressurized, compressed, or operative state/position. Further, the embodiments relate to opening a thief hatch to provide visual and/or physical access to gaskets or other components while maintaining the actuating mechanism in the pressurized, compressed, or operative state/position which maintains the internal pressure of the storage tank. Additionally, the embodiments relate to a valve pressure assembly that provides safer, efficient, and environmentally sound process for inspecting, maintaining, and/or replacing gaskets or components of the thief hatch. The embodiments described herein reduce installation, operating, maintenance, and replacement costs of a thief hatch while increasing efficiency and safety of the thief hatch. It should be understood that the descriptions and figures that utilize a thief hatch and storage tank are exemplary only. The exemplary assembly can be used with other pressurized structures and associated piping and valves.

Figure 1:
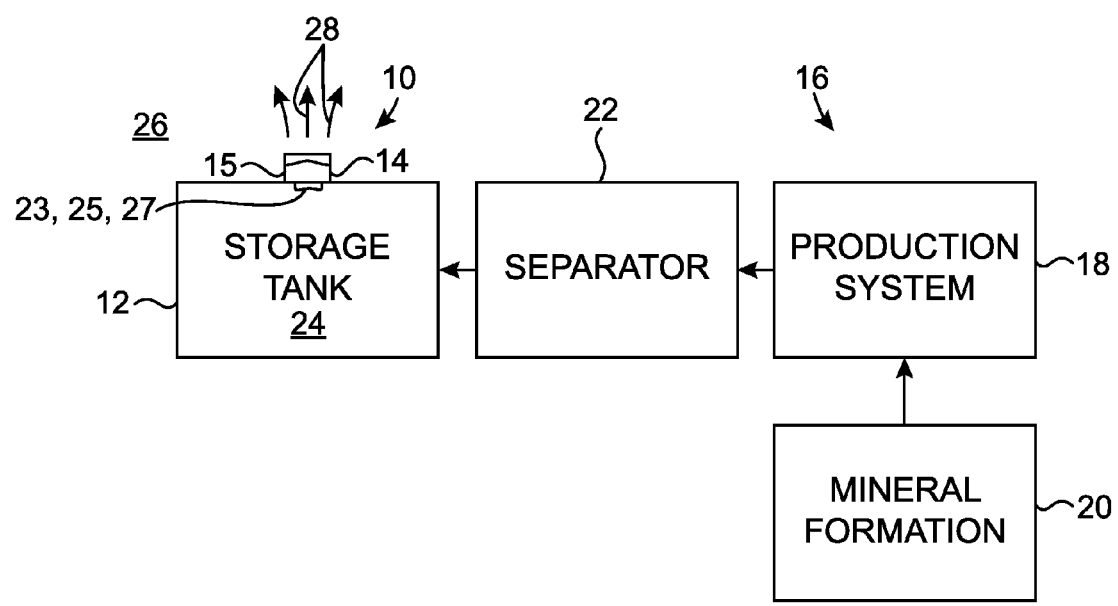
FIG. 1 is a schematic view of a storage tank, a thief hatch, and an exemplary valve pressure assembly coupled to the thief hatch.

FIG. 1 is a schematic view of a storage tank system 10 having a storage tank 12, a thief hatch 14 and a valve pressure assembly 15 coupled to the thief hatch 14. As will be appreciated, the storage tank system 10 may be a component of a variety of applications. In the illustrated embodiment, the storage tank system 10 is a component of a mineral recovery system 16, which includes a production system 18 configured to recover a mineral (e.g., oil and/or gas) from a mineral formation 20, such as a well. As the production system 18 recovers minerals from the mineral formation 20, the minerals recovered may be processed in a separator 22. Specifically, the separator 22 is designed to separate production fluids into their constituent components. For example, production fluids may be separated into oil, gas, fracking fluid, and water components. Thereafter, a constituent component or fluid separated by the separator 22 may be flowed into the storage tank 12 for storage.

When a fluid is stored in the storage tank 12, pressure may build within the storage tank 12. In certain embodiments, it may be desirable to vent or release pressures within an interior 24 of the storage tank 12 that are above a threshold pressure (for example, a venting threshold pressure). As such, the storage tank 12 includes the thief hatch 14, which is configured to open (for example, periodically open) fluid communication between the interior 24 of the storage tank 12 and an environment 26 external to the storage tank 12. In particular, the thief hatch 14 may be configured to open fluid communication between the interior 24 of the storage tank 12 and the environment 26 surrounding the storage tank 12 when the pressure within the interior 24 of the storage tank 12 exceeds a threshold pressure. In this manner, vapor or fluid may be vented from the storage tank 12, as indicated by arrows 28, thereby decreasing the internal pressure of the storage tank 12. Once the internal pressure of the storage tank 12 falls below the threshold pressure, a seal assembly 23 of the thief hatch 14 may automatically close and re-seal, thereby blocking fluid communication between the interior 24 of the storage tank 12 and the external environment 26. In an embodiment, the seal assembly 23 includes a pressure relief valve 25 and a valve seat 27. The thief hatch 14 may have various features to improve operation, reliability, maintenance, and performance of the thief hatch 14. Additionally, the thief hatch 14 may have a self-leveling and self-centering sealing mechanism (not shown) and/or a quick release mechanism (not shown) configured to actuate when an internal pressure of the storage tank 12 exceeds an elevated threshold pressure such as, for example only, a threshold pressure greater than the venting threshold pressure.

Figure 2:
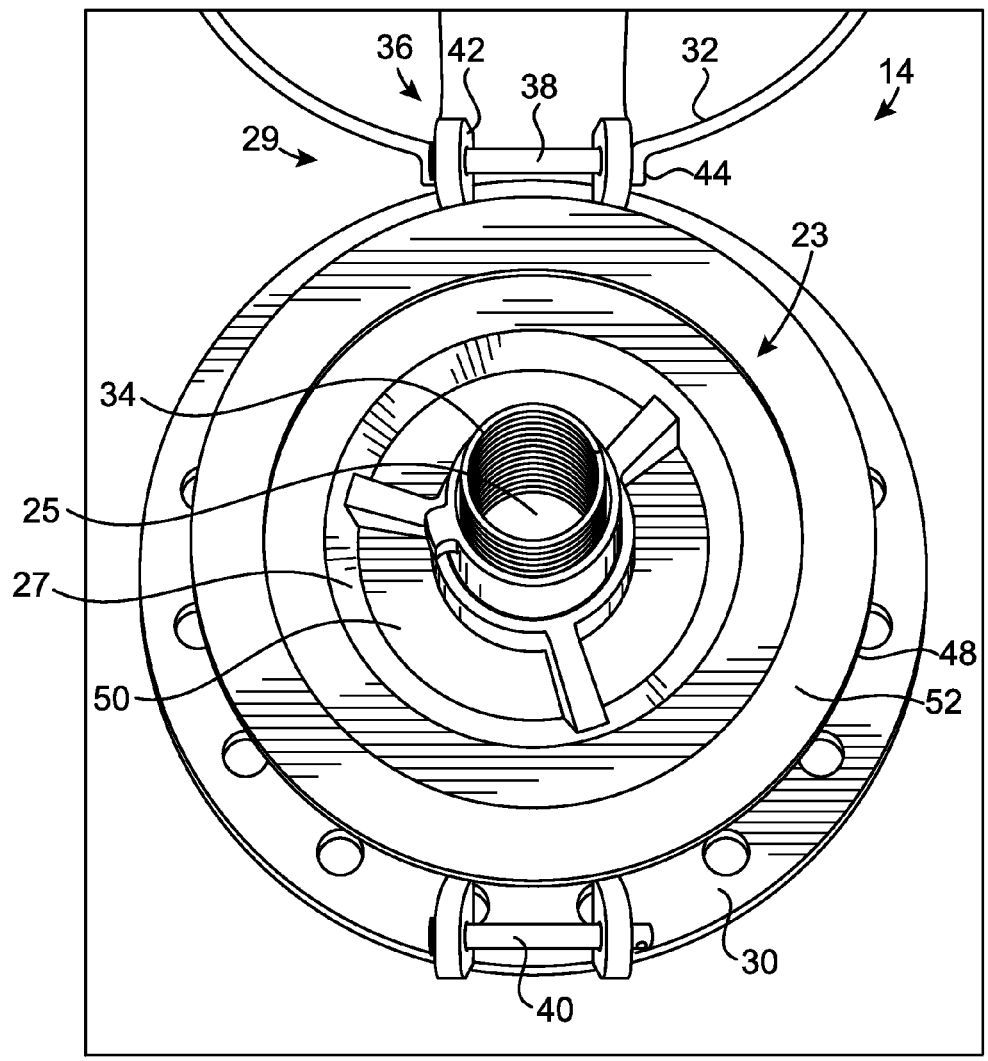
FIG. 2 is a perspective view of the thief hatch with a cap in an open position and exposing an actuating mechanism, a base, an annular lip, an inner gasket, and an outer gasket.

FIG. 2 is a perspective view of the thief hatch 14 in an open position 29. As shown, the thief hatch 14 includes a base 30, a cap 32, and an actuating mechanism 34. More specifically, the cap 32 is coupled to the base 30 by a hinged connection 36. The hinged connection 36 includes a clevis pin 38 that is positioned between two hinged flanges 44 of the base 30. Another clevis pin 40 may further extend through the two hinged flanges 44 of the base 30 and through two hinge flanges 44 of the cap 32. A releasable latch (not shown) is configured to releasably couple the cap 32 to the base 30 via the clevis pin 38.

When the thief hatch 14 is installed onto the storage tank 12, the base 30 is disposed about an opening (not shown) of the storage tank 12, and the base 30 is mechanically attached to the storage tank 12. For example, the base 30 may be coupled to the storage tank 12 by bolts, rivets, welds, or other suitable means. In operation, the thief hatch 14 is configured to seal the opening of the storage tank 12. In other words, the thief hatch 14 blocks fluid communication between the interior 24 of the storage tank 12 and the environment 26 surrounding the storage tank 12. Additionally, to enable the passage of a tool or other instrument (not shown) through the opening of the storage tank 12, the releasable latch 38 may be released, and the cap 32 may pivot about the hinged connection 36 and relative to the base 30. In this manner, the cap 32 and seal assembly 23 of the thief hatch 14 may expose the opening of the storage tank 12, thereby enabling an operator to position the tool or other instrument into the storage tank 12.

When the thief hatch 14 is installed, the seal assembly 23 abuts an annular lip 48 of the base 30. In the exemplary embodiment, the seal assembly 23 includes an inner gasket 50 and an outer gasket 52. The inner gasket 50 is positioned around the valve seat 27. When the cap 32 is closed, the inner gasket 50 facilitates sealing the valve seat 27 to keep the vapors/fluid within the storage tank 12. Moreover, when the cap 32 is closed, an outer gasket 52 facilitates sealing the cap 32 to the keep any vapors/fluid that has passed the inner gasket 50 from escaping the cap 32. The inner gasket 50 and the outer gasket 52 reduce and/or prevent vapor/fluid leakage of the storage tank 12 and into the atmosphere or surrounding environment 26. In particular, the actuating mechanism 34 may apply a downward, axial force on the seal assembly 23, as described below, thereby biasing the valve 25. For example, the actuating mechanism 34 may include a spring that applies an axial, downward force on the valve 25.

Figure 3:
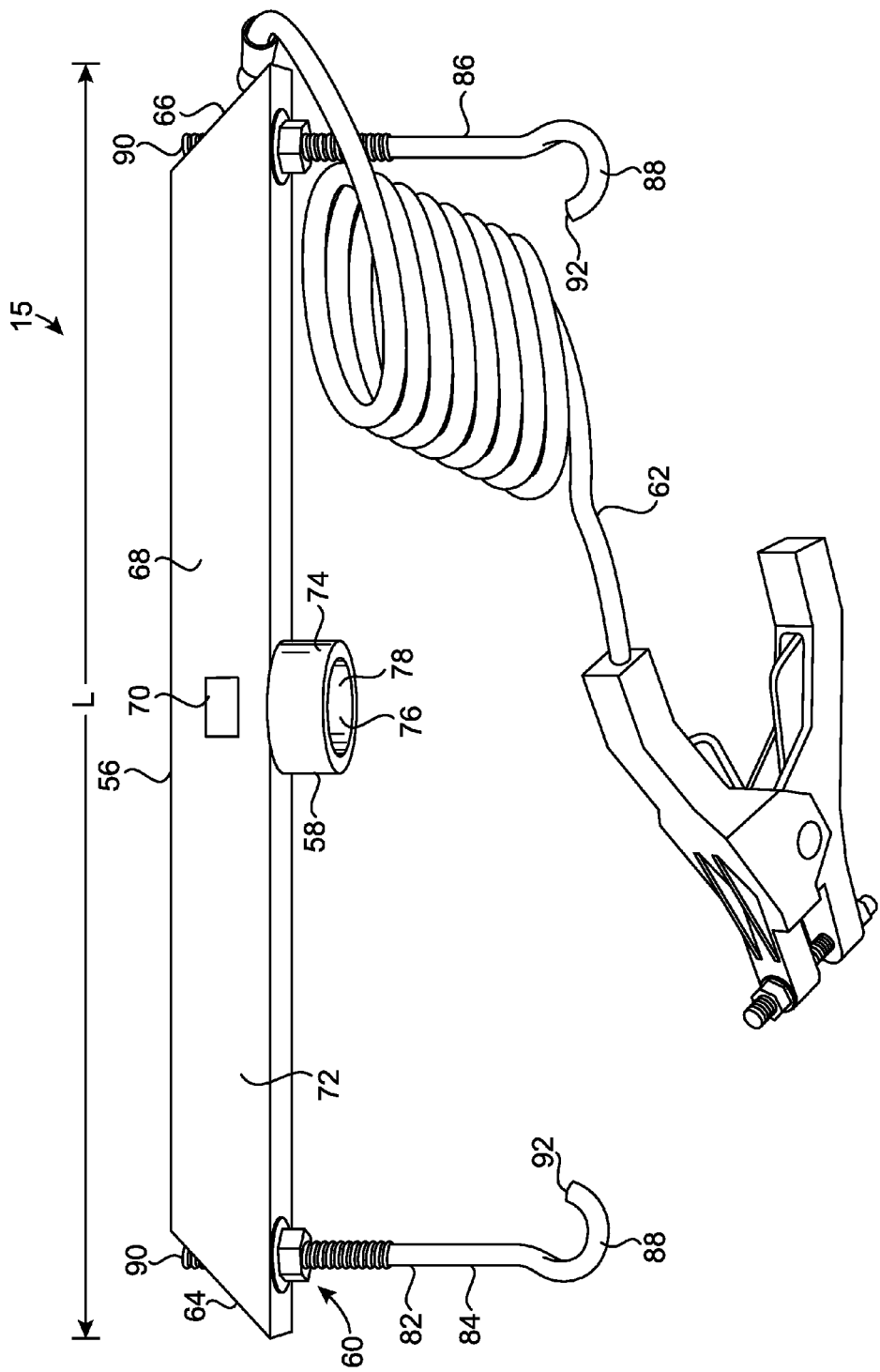
FIG. 3 is a perspective view of the exemplary valve pressure assembly and illustrating a pressure bar, a connector, a clamp, and an electrical ground.
Figure 4:
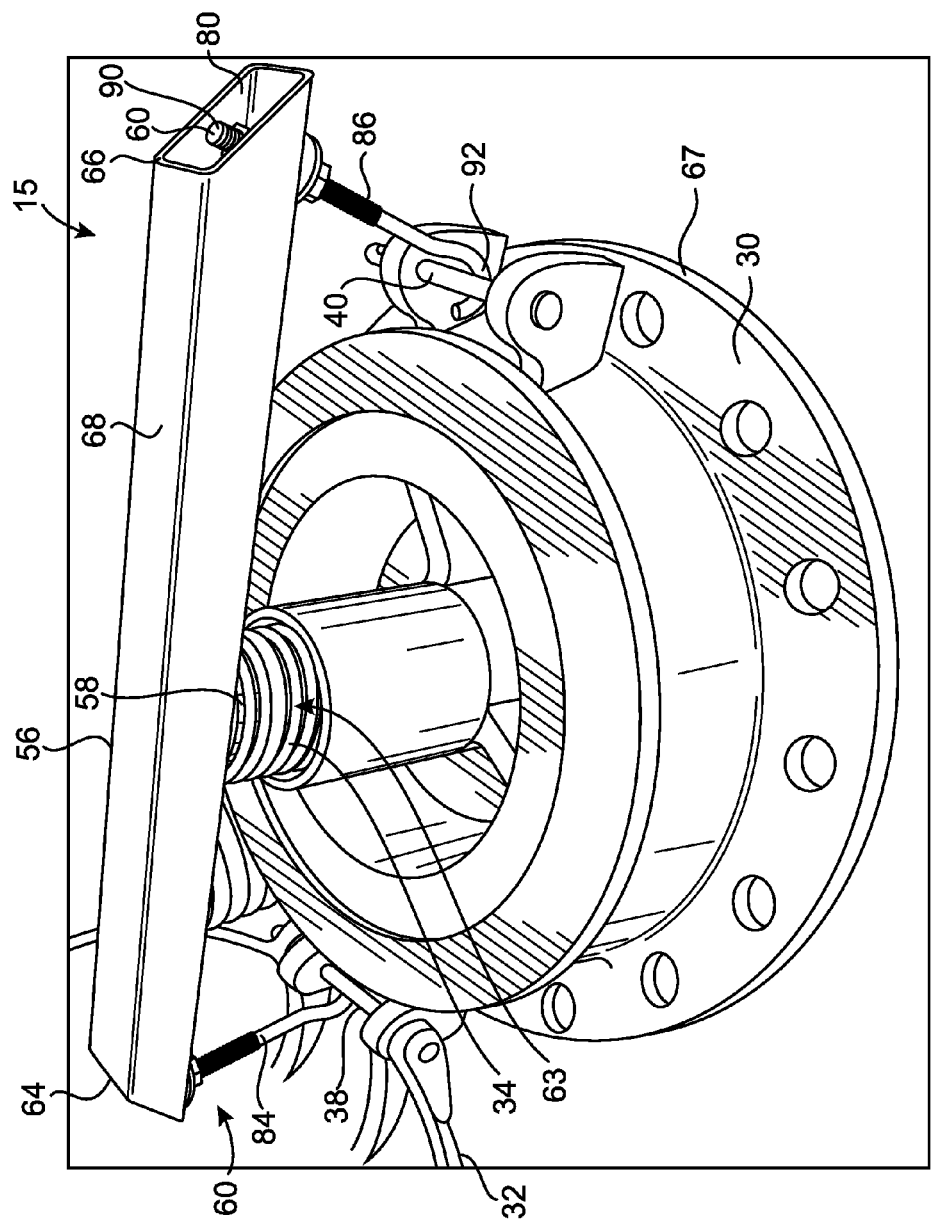
FIG. 4 is a perspective view of the cap of the thief hatch in the open position and the valve pressure assembly coupled to the base.
Figure 5:
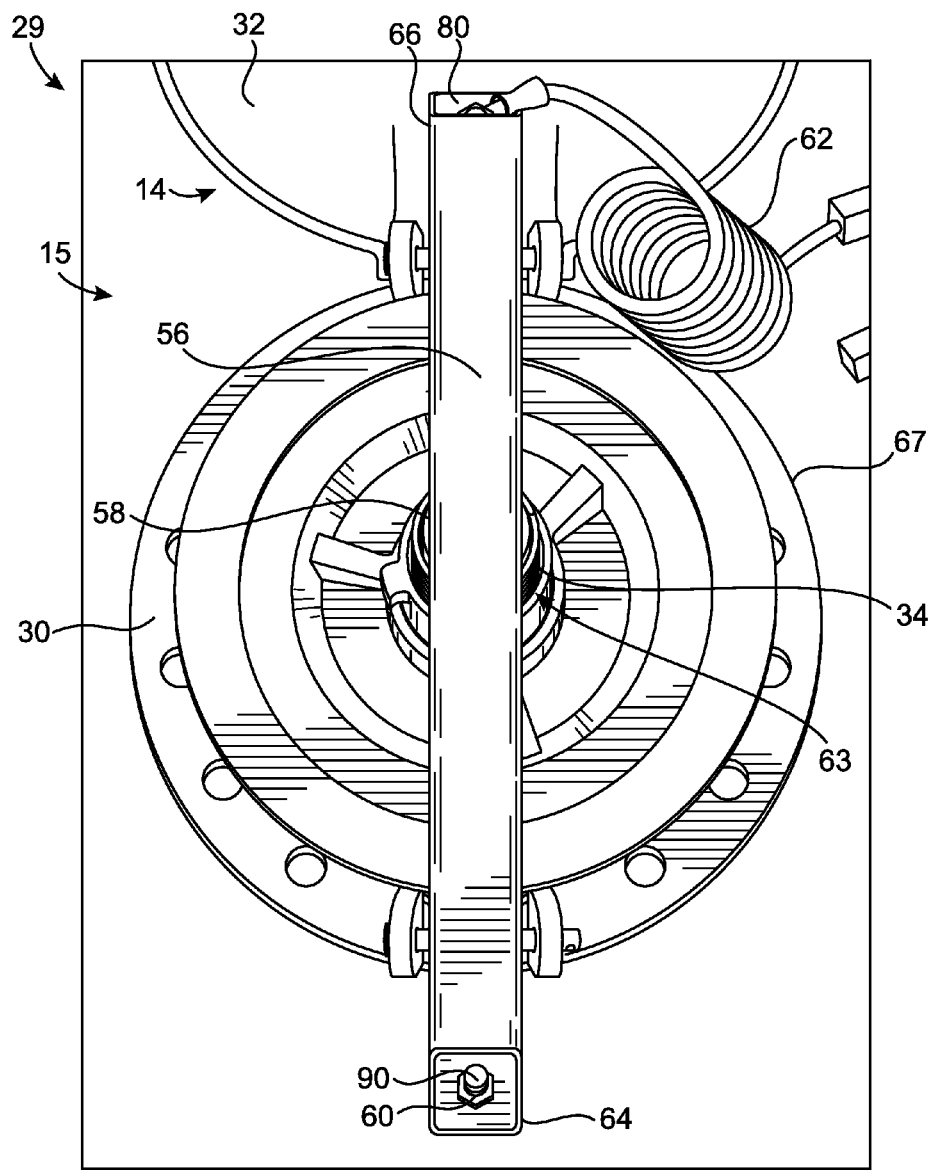
FIG. 5 is another perspective view of the cap of the thief hatch in the open position and the valve pressure assembly coupled to the base.

FIG. 3 is a perspective view of the valve pressure assembly 15. FIG. 4 is a perspective view of the cap 32 of the thief hatch 14 in the open position 29 and illustrating the valve pressure assembly 15 coupled to the base 30. FIG. 5 is another perspective view of the cap 32 of the thief hatch 14 in the open position 29 and the valve pressure assembly 15 coupled to the base 30. The valve pressure assembly 15 includes a pressure bar 56, a connector 58, and a clamp 60. The valve pressure assembly 15 includes an electrical ground 62 removably coupled to the pressure bar 56. As described herein, the valve pressure assembly 15 is configured to couple to the thief hatch 14 and facilitate pressuring the actuating mechanism 34 to remain in the operative position 63 while the cap 32 is in the open position 29. In the exemplary embodiment, the operative position 63 includes the actuating mechanism 34 being pressured, compressed, forced, or moved against at least one of the valve 25 and the base 30.

The pressure bar 56 includes a first end 64, a second end 66, and a body 68 located between the first end 64 and the second end 66. The body 68 has a length L as measured between the first end 64 and the second end 66. In the exemplary embodiment, the length L is about or slightly larger than a diameter of a flange 67 of the thief hatch 14. The length L is configured to easily and efficiently couple the pressure bar 56 to the flange 67 via the clamp 60. Alternatively, the length L can be less than the diameter of the flange 67. Still further in an embodiment, the body 68 has an adjustable length between the first end 64 and second end 66. An adjuster 70 such as, but not limited to, a telescoping section is configured to adjust the length of the body 68. In this embodiment, the adjustable length of the pressure bar 56 is configured to couple to a variety of flanges having different sizes, shapes, and diameters.

The pressure bar 56 includes a material composition 72 that is durable and resistant to corrosive environments. In one embodiment, the pressure bar 56 includes an electrical insulating material. The electrical insulating material is configured to operate as an electrical ground to reduce and/or eliminate electrical charge applied to the worker handling the pressure bar 56 during operations.

The connector 58 is coupled to the body 68. More particularly, the connector 58 is coupled about half way along the length L of the body 68. Alternatively, the connector 58 can couple to any position on the body 68. In the exemplary embodiment, the connector 58 is sized and shaped to removably couple to the actuating mechanism 34. For example, when the actuating mechanism 34 includes a spring, the connector 58 includes a circular shape. More particularly, the connector 58 includes an outer circular wall 74 and an inner circular wall 76 which defines a channel 78 within. In the embodiment, the outer circular wall 74 removably fits within an opening of the spring to facilitate coupling the connector 58 to the spring actuating mechanism 34. The connector 58 is configured to insert within the actuating mechanism 34 when the actuating mechanism 34 is in the operative position 63. In another embodiment, the spring pressurably fits to the inner circular wall 76 and within the channel 78 such that the connector 58 is configured to receive the actuating mechanism 34 when the actuating mechanism 34 is in the operative position 63. In an alternative embodiment, the connector 58 includes a plurality of connectors having different shapes and sizes. In this embodiment, the connector can be removably coupled to the body 68 to provide the different connectors to couple with different types and sizes of actuating mechanisms 34.

The clamp 60 is configured to couple to the pressure bar 56 wherein the clamp 60 can couple to at least one of the first end 64, the second end 66, and the body 68. The pressure bar 56 includes a channel 80 positioned on at least at one of the first end 64 and the second end 66. The channel 80 is configured to receive the clamp 60. The channel 80 is sized and shaped to provide access to the clamp 60 while substantially enclosing the clamp 60. The clamp 60 can extend within the channel 80 but preferably not beyond the channel 80. By substantially enclosing the clamp 60, the channel 80 minimizes or prevents the clamp exposure which can hurt a worker's hands while the worker handles the pressure bar 56. Alternatively, the claim 60 can extend beyond the channel 60.

The clamp 60 includes a fastener 82 which is configured to removably couple to the base 30. The fastener 82 can include a first fastener 84 adjustably coupled to the first end 64 and second fastener 86 adjustably coupled to the second end 66. In an embodiment, the first fastener 84 and the second fastener 86 include a threaded hook 88. Proximal ends 90 of each fastener 84, 86 removably couple respectively to the first end 64 and the second end 66 and within the channel 80. The length L of the body 68 facilitates the position of the first end 64 and the second end 66 with respect to the first fastener 84 and the second fastener 86 and with respect to the pivot pins 38, 40. Distal ends 92 of each fastener 84, 86 removably couple to the pivot pins 38, 40. The first fastener 84 and the second fastener 86 are configured to adjustably move the pressure bar 56 and the connector 58 in contact with the actuating mechanism 34. More particularly, nuts of the proximal ends 90 are adjustable relative to the fasteners 84, 86 to selectively and reciprocally move the pressure bar 56 relative to the actuating mechanism 34 and/or the pins 38, 40. The adjustment of the first fastener 84 and/or the second fastener 86 moves the pressure bar 56 and the connector 58 to facilitate pressuring or compressing or moving the actuating mechanism 34 to remain in the operative position 63.

Figure 6:
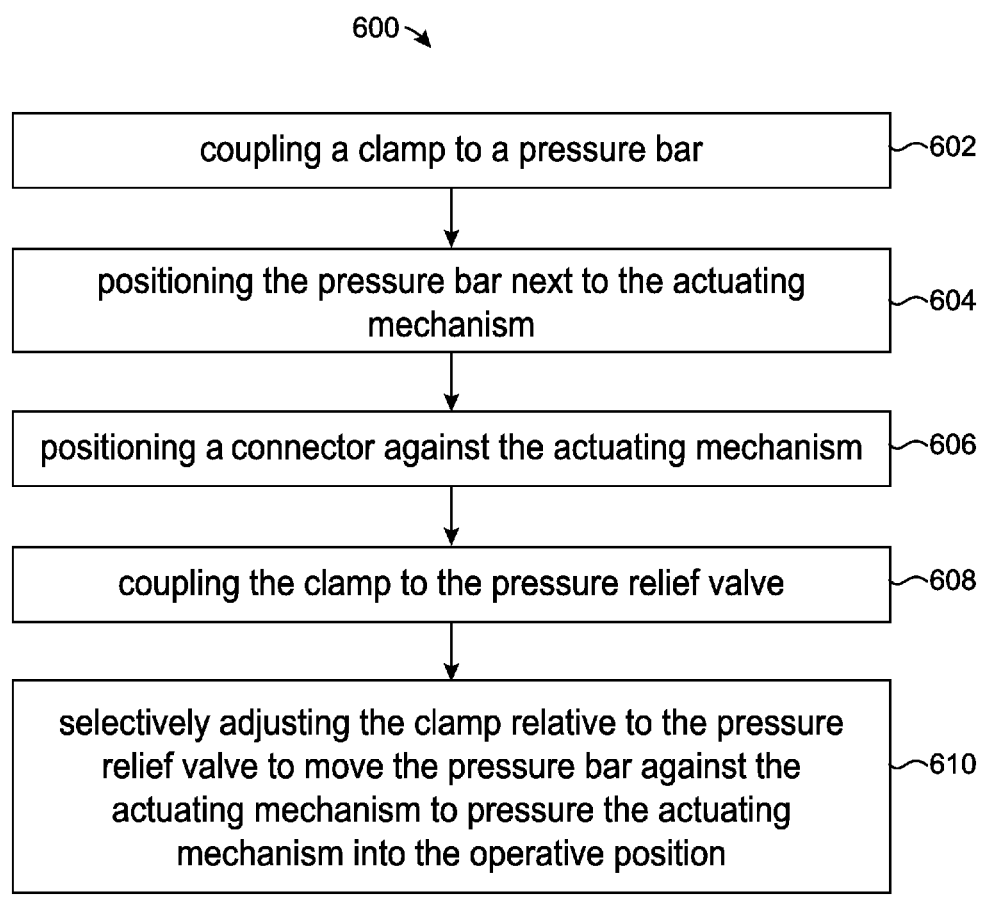
FIG. 6 is a flowchart illustrating an exemplary method of operating the valve pressure assembly of FIG. 1.

FIG. 6 is a flowchart illustrating an exemplary method of operating the valve pressure assembly 15. As mentioned, the thief hatch 14 is configured to vent pressure within the interior 24 of the storage tank 12 when the pressure exceeds a threshold value (for example, a venting threshold value). To this end, the valve 25 of the seal assembly 23 is exposed to the interior 24 of the storage tank 12 through the central opening of the base 30. For example, in the illustrated embodiment, when an internal pressure of the storage tank 12, represented by arrows 28, exceeds a threshold value, the internal pressure acting on the valve 25 may cause the spring 54 to compress against the cap 32. As the spring compresses, the internal pressure forces the valve 25 axially upward, thereby breaking the seal interface. With the seal interface broken, vapor may exit the storage tank 12 through the central opening of the base 30.

Once the internal pressure within the storage tank 12 falls below the threshold pressure (for example, due to vapor venting from the storage tank 12 in the downward) axial force applied to the valve 25 by the actuating mechanism 34 may overcome the upward, axial force applied by the internal pressure of the storage tank 12. As a result, the valve 25 may move axially downward to re-engage with the storage tank 12 and re-establish the sealing interface. As will be appreciated, the stiffness of the spring 54 may be selected to effectuate a desired threshold pressure (for example, venting threshold pressure) of the storage tank 12. That is, the internal pressure that causes the valve 25 to lift and vent the storage tank 12 in the manner described above may be varied based on the stiffness of the spring 54. Similarly, in embodiments of the actuating mechanism 34 having other actuators, the actuator may be selected or modified to effectuate a desired threshold pressure of the thief hatch 14.

During an exemplary operation, the worker disconnects the cap 32 from the base 30 by removing the cap 32 from the pivot pin 40. The worker also couples the electrical ground 62 to the clamp 60 and to a grounded surface (not shown) for safety purposes. In the exemplary embodiment, the cap 32 rotates between the open position 29 and a closed position relative to the base 30. More particularly, the cap 32 rotates about one of the pivot pins 38, 40 to expose at least one of the actuating mechanism 34, the annular lip 48 of the base 30, the inner gasket 50, and the outer gasket 52. The worker selects the appropriate length L of the pressure bar 56 relative to the diameter of the flange 67. Alternatively, the worker can adjust the adjuster 70 of the pressure bar 56 to selectively choose the length of the pressure bar 56.

The worker couples 602 the clamp 60 to the pressure bar 56. In the exemplary embodiment, the worker couples the first fastener 84 to the first end 64 and the second fastener 86 to the second end 66. In an embodiment, the worker can thread the nuts of the hook fastener to the first end 64 and the second 66. The channels 80 of the pressure bar 56 exposes the first end 64 and the second end 66 to facilitate coupling of the first fastener 84 and the second fastener 86 respectively thereto. Moreover, the channels 80 substantially enclose the first fastener 84 and the second fastener 86 to reduce impact injury of the fasteners 84, 86 applied to the worker's hands.

While the clamp 60 is in the open position 29, the clamp 60 couples to the base 30. More particularly, in the open position 29, the fasteners 84, 86 adjustably couple the pressure bar 56 to the pivot pins 38, 40 of the base 30. Moreover, while the cap 32 is in the open position 29, the clamp 60 couples the pressure bar 56 to the actuating mechanism 34. While coupling the pressure bar 56 to the actuating mechanism 34, the cap 32 in the open position 29 provides visual and/or physical access to at least one of the actuating mechanism 34, the inner gasket 50, and the outer gasket 52.

During operation, the couple positions 604 the pressure bar 56 next to the actuating mechanism 34. The worker can align the connector 58 with the actuating mechanism 34. The connector 58 is positioned 606 within the actuating mechanism 34. Alternatively, the connector 58 can be positioned against the actuating mechanism 34. The worker couples 608 the clamp 60 to the base 30. More particularly, the worker couples the adjustable fastener to the pivot pins 40. The clamp 60 is selectively adjusted 610 relative to the base 30 to move the pressure bar 56 against the actuating mechanism 34 to pressure the actuating mechanism 34 into the operative position 63. Accordingly while the cap 32 is in the open position 29, the first fastener 84 and the second fastener 86 are selectively adjusted to move the pressure bar 56 against the actuating mechanism 34 to pressure the actuating mechanism 34 to remain in the operative position 63. In one method, the connector 58, while inserted within the actuating mechanism 34, facilitates compressing the actuating mechanism 34 to the operative position 63.

The first fastener 84 and the second fastener 86 remain coupled to the pressure bar 56 and to the pivot pins 40 of the base 30 to further maintain the actuating mechanism 34 in the operative state. While the cap 32 is in the open position 29 and the actuating mechanism 34 is in the operative state, the worker can visually and physically access the inner gasket 50 and outer gasket 52 while the actuating mechanism 34 maintains the pressure on the relief valve 25. Accordingly, pressurized vapors and/or fluids will not be discharged and/or exposed to the worker while the cap 32 is in the open position 29. Moreover, the worker can conduct maintenance tests such as soap scrubbing the inner gasket 50 to determine if the inner gasket 50 is failing or leaking vapors and/or fluids. If the worker determines that the inner gasket 50 has failed, the worker can replace the inner gasket 50 through ordinary maintenance and replacement procedures. Moreover, if the worker determines that the inner gasket 50 is working, the worker can replace the outer gasket 52.

In certain embodiments, the thief hatch 14 may include control, monitoring, and/or other components configured to regulate and/or control operation of the thief hatch 14. For example, in the illustrated embodiment, the actuating mechanism 34 may include a sensor and a controller having a memory and a processor (none shown). The sensor may be configured to collect feedback (for example, measured feedback) indicative of one or more operating parameters of the thief hatch 14. For example, the sensor may be a proximity sensor, a position sensor, a flow sensor, a pressure sensor, or other type of sensor. In one embodiment, the sensor may measure a number of venting cycles of the thief hatch 14. In such an embodiment, the number of venting cycles may be stored in the memory of the controller, and an operator may retrieve and/or monitor the stored information. As will be appreciated, other measured feedback (for example, flow rates, pressures) may be stored within the memory. Furthermore, in certain embodiments, the controller may be configured to operate the thief hatch 14 (such as, automatically). For example, the controller may be configured to operate the actuating mechanism 34 (for example, an electrical actuator) based on feedback measured by the sensor. Additionally, venting of the thief hatch 14 may be selectively controlled by an operator using the controller. For example, the controller may be configured to operate the actuating mechanism 34 such that the thief hatch 14 vents the storage tank 12 on a predetermined interval.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

Exemplary embodiments of pressure valve assembly are described herein. The methods and assemblies are not limited to the specific embodiments described herein, but rather, components of assemblies and/or steps of the methods may be utilized independently and separately from other components and/or steps described herein. For example, the methods may also be used in combination with other assemblies and methods, and are not limited to practice with only the assemblies and methods described herein. Rather, the exemplary embodiments may be implemented and utilized in connection with many other pressurized environments such as, for example only, storage trucks and containers.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using devices or assemblies or systems and performing any incorporated method. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A valve pressure assembly for pressurizing an actuating mechanism of a thief hatch, the valve pressure assembly comprising:
    a pressure bar comprising a first end, a second end, and a body located between the first end and the second end;
    a connector coupled to the body and configured to removably couple to the actuating mechanism; and
    a clamp coupled to at least one of the first end and the second end, the clamp comprising a fastener removably coupled to the relief valve, wherein the fastener is configured to adjustably move the pressure bar and the connector in contact with the actuating mechanism to facilitate pressuring the actuating mechanism to remain in an operative position.

2. The valve assembly of claim 1 wherein the bar comprises a channel which is configured to receive the clamp.

3. The valve pressure assembly of claim 1 wherein the connector is configured to insert within the actuating mechanism when the actuating mechanism is in the operative position.

4. The valve assembly of claim 1 wherein the connector is removably coupled to the body.

5. The valve pressure assembly of claim 1 wherein the fastener comprises a first fastener adjustably coupled to the first end and comprises a second fastener adjustably coupled to the second end.

6. The valve pressure assembly of claim 1 wherein the fastener comprises a hook threaded fastener.

7. The valve pressure assembly of claim 1 further comprising an electrical ground coupled to the bar.

8. The valve assembly of claim 1 wherein the body is adjustable in length between the first end and the second end.

9. The valve assembly of claim 1 wherein the body comprises an electrically insulating material.

10. The valve pressure assembly of claim 1 wherein the connector is configured to receive the actuating mechanism when the actuating mechanism is in the operative position.

11. A valve assembly for coupling to a storage container, the valve assembly comprising:
    a thief hatch comprising:
        a base configured to couple to the storage container;
        a cap rotatably coupled to the base; and
        an actuating mechanism configured to exert a biasing force against a valve that is positioned in flow communication with the storage container; and
    a valve pressure assembly coupled to the thief hatch and comprising:
        a pressure bar comprising a first end, a second end, and a body located between the first end and the second end;
        a connector coupled to the body and configured to removably couple to the actuating mechanism; and
        a clamp coupled to at least one of the first end and the second end, the clamp comprising a fastener removably coupled to the thief hatch, wherein the fastener is configured to adjustably move the pressure bar and the connector in contact with the actuating mechanism to facilitate pressuring the actuating mechanism to remain in an operative position.

12. The valve assembly of claim 11 wherein the cap is configured to rotate between an open position and a closed position relative to the base and the clamp is configured to couple the pressure bar to the actuating mechanism while the cap is in the open position.

13. The valve assembly of claim 11 further comprising a first gasket and a second gasket coupled to the base.

14. The valve assembly of claim 13 wherein the cap is configured to rotate between an open position and a closed position relative to the base and the clamp is configured to couple the pressure bar to the actuating mechanism while the cap is in the open position and while providing access to at least one of the first gasket and the second gasket.

15. The valve pressure assembly of claim 11 wherein the cap is configured to rotate between an open position and a closed position relative to the base and the clamp is configured to couple to the base while the cap is in the open position.

16. The valve pressure assembly of claim 11 wherein the cap is configured to rotate between an open position and a closed position relative to the base and the clamp is configured to adjustably couple to the base while the cap is in the open position.

17. The valve pressure assembly of claim 11 wherein the cap is configured to rotate between an open position and a closed position relative to the base and the clamp is configured to move the pressure bar relative to the base while the cap is in the open position.

18. A method of operating a valve pressure assembly to maintain an actuating member of a pressure relief valve in an operating position, the method comprising:
    coupling a clamp to a pressure bar;
    positioning the pressure bar next to the actuating mechanism;
    coupling the clamp to the pressure relief valve; and
    selectively adjusting the clamp relative to the pressure relief valve to move the pressure bar against the actuating mechanism to pressure the actuating mechanism into the operative position.

19. The method of claim 18 further comprising positioning a connector against the actuating mechanism.

20. The method of claim 18 wherein coupling the clamp to the pressure bar and coupling the clamp to the pressure relief valve comprises coupling an adjustable fastener to the pressure relief valve.

* * * * *